Oct. 4, 1932.   J. N. KIEP   1,881,083
HYDRAULIC COUPLING
Filed July 11, 1931   4 Sheets-Sheet 1
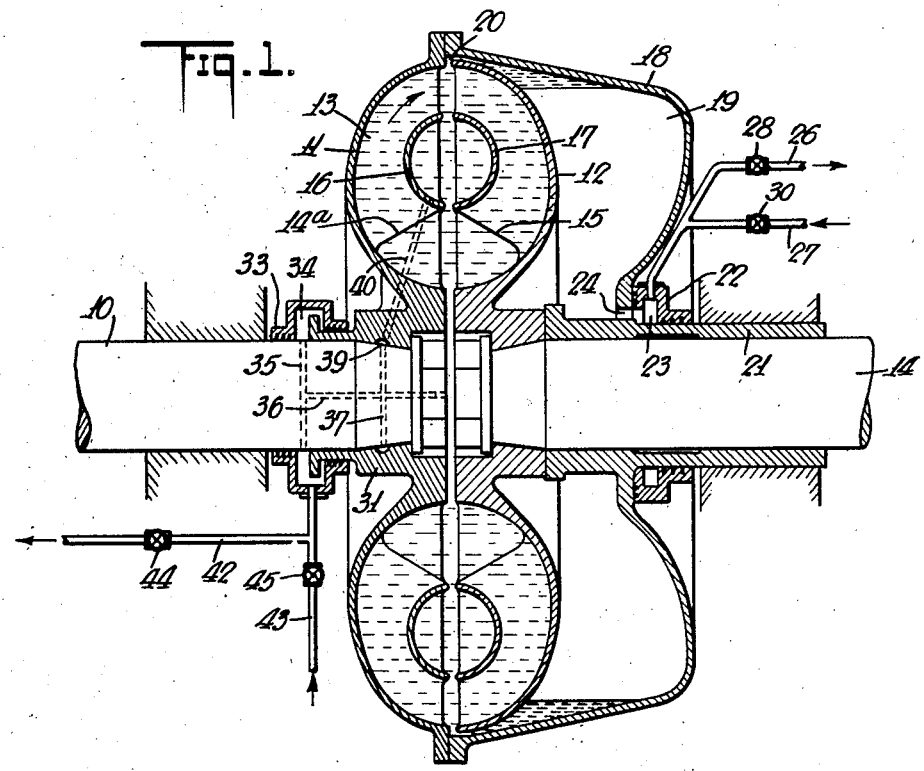
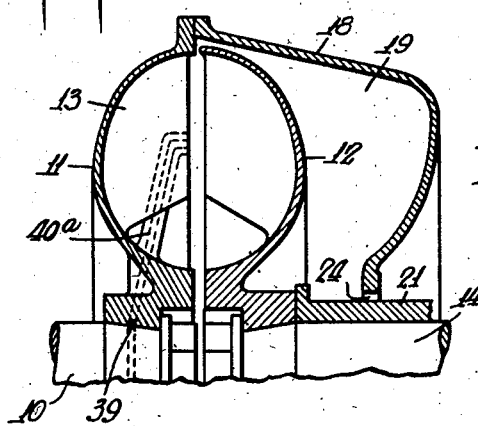
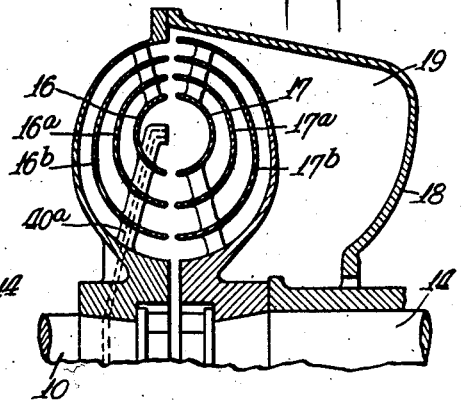
INVENTOR
Johann Nikolaus Kiep
BY
ATTORNEYS

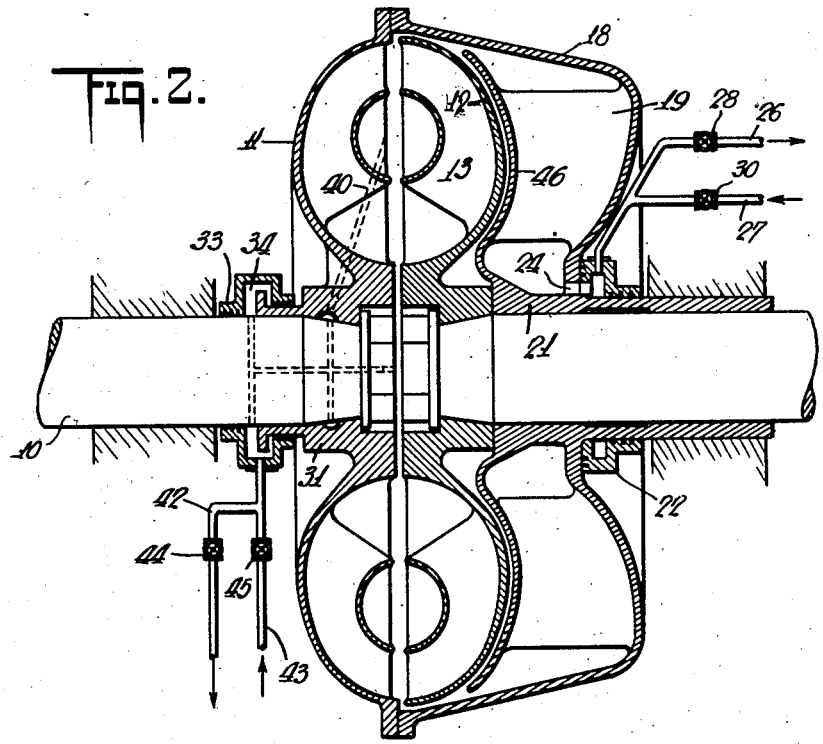

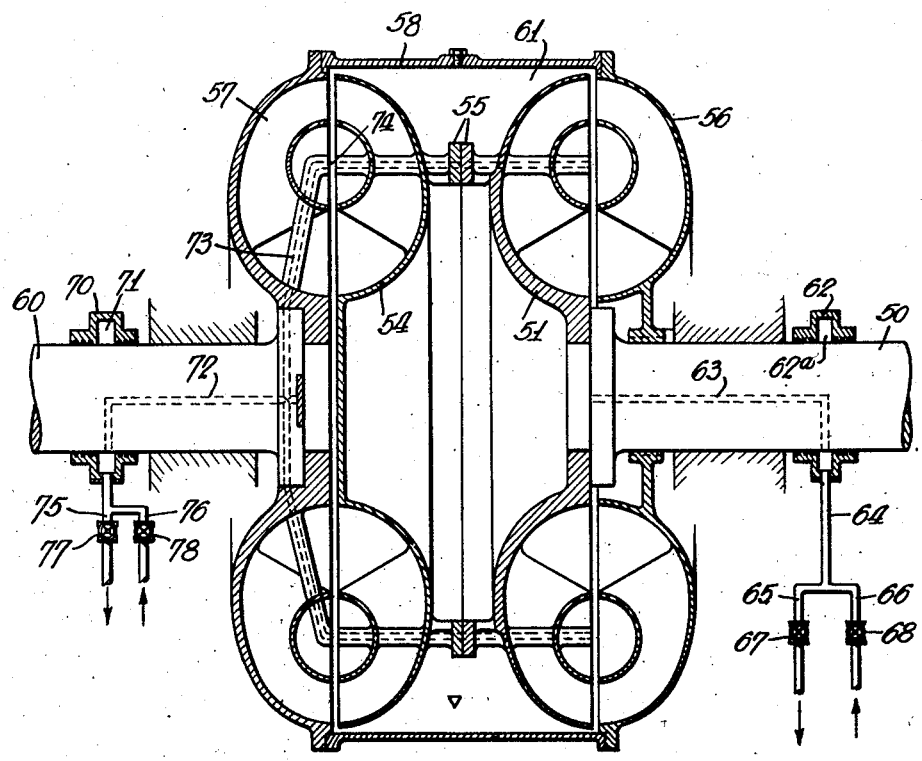

Oct. 4, 1932.  J. N. KIEP  1,881,083
HYDRAULIC COUPLING
Filed July 11, 1931   4 Sheets-Sheet 4
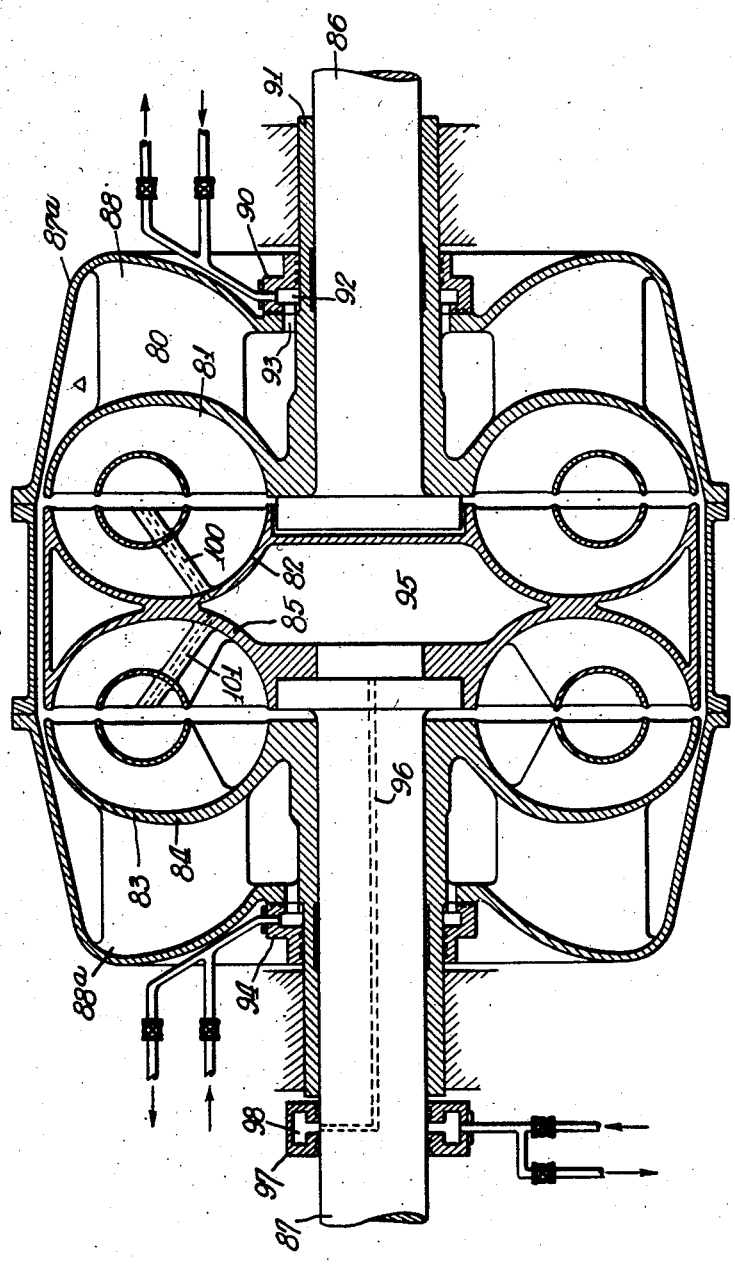
INVENTOR
Johann Nikolaus Kiep
BY
ATTORNEYS Patented Oct. 4, 1932

1,881,083

UNITED STATES PATENT OFFICE

JOHANN NIKOLAUS KIEP, OF ALTONA-HOCHKAMP, GERMANY

HYDRAULIC COUPLING

Application filed July 11, 1931, Serial No. 550,108, and in Germany November 29, 1930.

The invention relates to hydraulic couplings of the Vulcan type, in which the driving or pump member and the driven or turbine member are so constructed and juxtaposed that the working liquid circulates through them in a vortex ring and the driving member delivers the liquid into the driven member so as to effect the rotation of the driven member by the kinetic energy of the liquid. A hydraulic coupling of this general character is shown and broadly claimed in the Föttinger Patent 1,199,359, issued Sept. 26, 1916.

It is sometimes desirable in a coupling of this character to selectively control the amount of liquid in the working chamber thereof to suit certain operating conditions, for instance to vary or control its slip between the driving and driven members during operations. It may also be desired to obtain driving or non-driving conditions of the coupling by filling or evacuating the working chamber.

One object of the present invention is to provide a new and improved method for controlling the quantity of liquid in the working chamber of the coupling, whereby a change in the quantity may be effected rapidly and efficiently.

As one novel feature of the invention I utilize gas pressure as the means for controlling the amount of liquid in the working chamber.

In carrying out my invention I provide a liquid supply chamber in open communication with the working chamber of the coupling and transfer liquid to or from the working chamber by varying the pressure of a gas in the supply chamber in contact with the liquid.

As the main important feature of the invention the supply chamber or receiver is connected to the driving members of the coupling for rotation therewith, and has its peripheral portion communicating with the interior of the working chamber at the periphery of the latter, preferably through the annular space or slit between the outer edges of the members. Thus in operation the liquid in the receiver is kept adjacent to a communicating passage by the action of centrifugal force. The gas is admitted to or discharged from the receiver nearer to the axis of rotation and within the annular rotating body of liquid in the receiver. As this receiver and the working chamber rotate, the liquid in both is urged towards the outer periphery of the coupling under action of centrifugal force. By controlling the pressure within the annular body of rotating liquid in said receiver the liquid may be forced into the working chamber by high gas pressure or permitted to discharge into the receiver by the action of centrifugal force on the liquid when the gas pressure is low.

As another important feature the receiver is made of such capacity and shape that it can take all or a large percentage of the driving liquid required to fill the working chamber. Thus under low gas pressure the working chamber may empty to such an extent that the remaining liquid, if any, is ineffective for the driving of the driven member. Under higher gas pressure the working chamber may be completely filled. Any intermediate extent of filling may be maintained by controlling the gas pressure.

As a further feature the controlling means for the gas pressure is located in a non-rotating part of the apparatus so that it may be operated at will when the coupling is rotating at any speed.

It is important that the gas be admitted at such a point that it does not penetrate or have to pass through the body of liquid. It is desirable that it be admitted at a point where the lowest liquid pressure is obtained. In the coupling itself this point is in the core of the liquid vortex ring or at a point within or near the periphery of a guide ring surrounding the core. In the receiver this point is as near as possible to the axis of rotation, but in any event nearer to the axis than is the periphery of the body of liquid rotating in and with the receiver.

The gas may be delivered to and withdrawn from both the receiver and the inner portion of the vortex ring in the working chamber. The liquid in the working chamber and in the receiver is subjected to the action of centrifugal force by the rotation of the coupling around its axis, but the liquid in the working chamber is also subjected to a velocity action in traveling around the core which tends to keep it against the outer walls of the coupling and away from the core. Therefore both of these forces act to evacuate the working chamber when the gas pressure in the receiver is low and the liquid may be forced in either direction by varying this pressure. The gas pressure delivered into the working chamber at or near the core acts to force the liquid outward radially from the core and accelerates the rate of liquid discharge and, when this pressure is higher than that in the receiver, will effect the complete emptying of the working chamber. By proper control of the gas pressures any extent of filling or emptying may be obtained and the slip controlled at any speed or at any time in the operation. The controlling of the gas pressure in the core of the working chamber or the control of the gas pressure in the receiver may constitute the sole means for effecting the control of liquid in the coupling. However, it is advantageous to combine both means so as to obtain their cooperative action, and to effect quicker and more complete control of the liquid and the slip of the coupling.

In the accompanying drawings, there are shown for purposes of illustration, several forms of device embodying the invention.

In these drawings:

Figs. 1, 2 and 3 are longitudinal central sections through different forms of coupling provided with my improved filling and evacuating means.

Fig. 4 is a central longitudinal section of one-half of a coupling having no core ring.

Fig. 5 is a similar section of a coupling having guide rings in the working chamber, and Figs. 6 and 7 are sections through couplings of the type having two working chambers and a single receiver.

In Fig. 1 I have shown my invention as adapted to a common type of coupling in which there is provided a driving shaft 10 having connected thereto a dished ring or wall 11 which cooperates with a dished ring or wall 12 to form a working chamber 13 therebetween, said dished ring 12 being connected to a driven shaft 14. The walls 11 and 12 of the driving and driven members have connected thereto series of blades 14 and 15 which latter are also connected to guide rings 16 and 17. These guide rings 16 and 17 are juxtaposed to form a core around which the impelling fluid in the working chamber circulates.

In carrying out my invention, the wall 11 of the driving member has connected thereto a casing or shell 18 which is spaced from the wall 12 of the driven member to form a liquid receiver or supply chamber 19. This chamber communicates with the working chamber of the coupling through a slot 20 between the outer peripheral edges of the walls 11 and 12 and has a volume which permits it to take a large percentage or all of the driving liquid required to fill the working chamber 13.

Connected to the shell or casing 18 and embracing the driven shaft 14 is a hub 21, and surrounding said hub 21 and adjoining said shell 18 is a stationary ring member 22 which forms with said hub an annular chamber 23. This chamber 23 communicates with the interior of the receiver or supply chamber 19 by means of one or more ports 24 and is mounted in sealed relationship with respect to said hub 21 and the shell 18 by a suitable packing.

Communicating with the annular chamber 23 is a gas pressure outlet conduit 26 and a gas supply conduit 27 which are provided with suitable control valves 28 and 30. The conduit 26 leads to a pressure exhaust chamber such as the induction side of a combustion engine or may open into the atmosphere. The conduit 27 on the other hand is connected to a gas pressure source. The gaseous medium may be air, gas, steam or the combustion gas drawn from the cylinder of a combustion engine. On the other hand this gaseous medium may be replaced by any substance induced into the driving liquid and forming a gas by chemical reaction therewith, or the gaseous medium may be formed by any other chemical reaction.

For regulating the pressure in the interior of the working chamber, the driving member has connected thereto a hub 31 which embraces the driving shaft 10. A stationary ring or casing 33 encircles and engages the end of the hub and a portion of the shaft and forms therewith an annular chamber 34. Communication between this annular chamber 34 and the interior of the working chamber is effected by a radial bore 35, an axial bore 36, and a radial bore 37 in the shaft 10, an annular chamber 39 which is formed in the hub 31, and one or more ducts 40 leading to core center of the working chamber.

Communicating with the non-rotatable annular chamber 34 are two conduits 42 and 43 having control valves 44 and 45. The conduit 42 leads to a pressure exhaust chamber such as the induction side of a combustion engine or may open into the atmosphere. The conduit 43 on the other hand is connected to a gas pressure source.

In the operation of this device, if it is desired to decrease the amount of fluid in the working chamber, the valve 45 may be opened to permit gas under pressure to flow into the interior of the core rings 16 and 17. This gas under pressure forces the liquid out through the passage 20 and into the receiver 19, until the working chamber is completely or partially emptied. The valve 45 may be left closed and the valve 28 may be opened to reduce the gas pressure in the receiver 19 so that the liquid is forced out by centrifugal force against the lowered gas pressure. Preferably both valves are opened if speedy evacuation is desired.

When it is desired to refill the working circuit, the valve 45 is closed and the valve 30 is opened so that gas under pressure enters into the receiving chamber 19. This pressure acts on the body of liquid in said chamber and coacts with the centrifugal force on said liquid to force said liquid into the interior of the working circuit. As the liquid is forced into the working chamber, the gas therein is permitted to escape through the conduit 42 by opening the valve 44.

As far as the broad aspects of the present invention are concerned, the means for evacuating a coupling by increasing the gas pressure in the interior of the working chamber may be effected without the means associated with the receiver 19. Also as far as the filling of the coupling is concerned, the flow of liquid into the coupling induced by the reduction in gas pressure in the interior of the working chamber may cooperate with other filling means besides the gas pressure control means associated with the receiver 19. On the other hand, the evacuation of the liquid from the working chamber of the coupling may be effected by reducing the pressure in the interior of the receiver 19, irrespective of the presence of the control means associated with the core of said working chamber. This is particularly true since the liquid in the receiver 19 is under centrifugal pressure alone; while the liquid in the working chamber is also under additional rotative pressure. Besides, the direction of rotation of the liquid in the working chamber is such that the emptying of the coupling through the passage 20 is naturally induced. Conversely, the filling of the coupling may be effected by increasing the pressure in said chamber 19 without the aid of the control means associated with the core center of the coupling. However, since it is desirable to effect rapid response to the actuation of the control means, it is advantageous to combine both gas pressure means shown.

In Fig. 2 there is shown a construction similar to the construction of Fig. 1, except that the hub 21 which is connected to the driving member has integral or otherwise connected thereto, a wall 46 which lies in close proximity to the wall 13 of the driven member and which serves to keep the main body of liquid away from said driven wall. In this way, the reaction of the wall 13 upon the body of liquid in the chamber 19 due to the relative rotation of the driving and driven members is eliminated and substantially the entire wall surface of the receiver is a part of the driving member.

In Fig. 3 there is shown a construction in which the reservoir chamber 19a is made rotatable with the driven member of the coupling, there being provided a wall member 47 disposed in close proximity to the shell 18a and connected to the wall 12 by means of tie members 48. In this way the main portion of the rotating liquid in said chamber is isolated from contact with the shell 18a and free from its reacting influence. Substantially the entire wall surface of the receiver is a part of the driven member. The gas inlet and outlet are through both the wall 47 and the casing 18a to said liquid receiver. Between the periphery of the wall 47 and the adjacent part of the wall 12 there may be vanes or blades acting to move the liquid inwardly and thus aid in keeping it in the receiver when the gas pressure in said receiver is low.

In Fig. 4 there is shown a construction which may be identical with that shown in Fig. 1 except that the core ring sections 16 and 17 are omitted. In this form the gas duct 40a leads to a point adjacent to the center of the liquid chamber where the pressure of the liquid traveling around in the vortex ring is the lowest.

In Fig. 5 there is shown a construction which may also be substantially identical with that shown in Fig. 1 except that in addition to the guide rings 16 and 17 defining the core, there are additional guide rings 16a and 16b in the driving member and 17a and 17b in the driven member. This construction so far as it involves the construction and use of such additional guide rings is claimed in companion application Serial No. 550,106, filed July 11, 1931.

In Fig. 6 there is shown a construction in which two working chambers are arranged to coact with a single receiver. In this construction, there is provided a driving shaft 50 which is connected to a driving member 51 of one working chamber. Oppositely disposed with respect thereto is a second driving member 54 of another working chamber, the two driving members 51 and 54 being interconnected by means of flanges 55 secured together. Cooperating with these driving members are driven members 56 and 57 joined together by a cylinder wall 58 and operating a driven shaft 60 connected to said driven member 57. A reservoir chamber 61 is formed between said cylinder wall 58 and the two driving members 51 and 54.

For regulating the gas pressure in the receiving chamber 61 there is provided a stationary ring 62 which is around the driving shaft 50 and which defines with said shaft an annular chamber 62a. This chamber 62a communicates with the interior of said chamber through a bore 63 in the shaft. It also communicates with a conduit 64 having two branch conduits 65 and 66 provided with control valves 67 and 68 respectively and leading to suitable sources of plus and minus gas pressure.

The gas pressure in the interior of the working chamber is controlled through the agency of a stationary ring 70 around the driven shaft 60 and forming therewith an annular chamber 71. This shaft 60 has bores 72 connecting the annular chamber 71 to a conduit 73 which passes through the core of the working chamber of one coupling and has the open end extending into the core center of the working chamber of the other coupling. The portion of the conduit 72 passing through the core of the first coupling is provided with apertures 74 for communicating with the gas in said core. Also communicating with the annular member 71 are conduits 75 and 76 having control valves 77 and 78 and connecting to sources of plus and minus gas pressure.

The operation of the construction of Fig. 6 is similar to the operation of the construction of Fig. 1.

In the construction shown in Fig. 7 a coupling 80 is provided which includes a driving member 81 and a driven member 82. Adjoining said coupling and mounted for conjoint action therewith is another coupling 83 which includes a driving member 84 and a driven member 85. The driving member 81 of the coupling 80 is mounted on a driving shaft 86 and the driven member 85 of the other coupling 83 is fixed to a driven shaft 87.

The two couplings 80 and 83 are enclosed in a casing 87a which connects the driving members 81 and 84 and forms a rotative unit therewith. This casing 87a forms with said driving members two chambers 88 and 88a which communicate with the working chamber of the couplings through the annular openings formed between the driving and driven members of said couplings.

The control of gas pressure in the chamber 88 is effected through a stationary ring 90 which embraces a sleeve 91 connected to the driving member 81 and which forms therewith an annular chamber 92. This ring 90 communicates with a suitable source of plus and minus pressure and also communicates with one end of the chamber 88 through ports 93. The gas pressure in the other chamber 88a is controlled through a ring 94 similar to the ring 90 and similar pipe connections and valves.

Between the driven members 82 and 85 there is formed a chamber 95 which communicates with an outside source of gas pressure through a bore 96 in the driven shaft 87. One end of this bore 96 communicates with a ring 97 embracing the shaft 87 and defining an annular chamber 98 therewith. This annular chamber 98 is connected to a suitable source of gas pressure similar to that shown in Figs. 1–4. The chamber 95 communicates with the core centers of the couplings 80 and 83 through conduits 100 and 101 respectively.

Having thus described my invention, what I claim as new and desire to secure by Letters Patent is:

1. A hydraulic coupling of the Föttinger type, including a driving member and a driven member coacting to form a liquid working chamber, a reservoir chamber mounted for rotation with one of said members and communicating with said working chamber, and means for selectively controlling the gas pressure in said reservoir chamber, whereby the flow of liquid between said working chamber and said reservoir chamber is correspondingly controlled.

2. A hydraulic coupling of the Föttinger type, including a driving member and a driven member coacting to form a liquid working chamber, a reservoir chamber mounted for rotation with one of said members and communicating with said working chamber at the periphery of the latter, and means for controlling the gas pressure in the interior of said reservoir chamber at a point nearer the axis of rotation than said periphery, whereby the flow of liquid between said working chamber and said reservoir chamber is correspondingly controlled.

3. A hydraulic coupling of the Föttinger type, including a driving member and a driven member coacting to form a liquid working chamber, means for varying the gas pressure in the interior of said working chamber to control the quantity of liquid therein.

4. A hydraulic coupling of the Föttinger type, including a driving member and a driven member coacting to form a liquid working chamber, and means for selectively varying the gas pressure in the core of said working chamber to effect the filling or discharge of the liquid in said working chamber.

5. A hydraulic coupling of the Föttinger type, including a driving member and a driven member coacting to form a liquid working chamber, a reservoir chamber mounted for rotation with one of said members, said reservoir chamber communicating with said working chamber, means for selectively controlling the gas pressure in said reservoir chamber, whereby the flow of liquid between said working chamber and said reservoir chamber is correspondingly controlled, and means for selectively controlling the gas pressure in the interior of said working chamber.

6. A hydraulic coupling of the Föttinger type, including a driving member and a driven member coacting to form a liquid working chamber, a reservoir chamber connected to one of said members for rotation therewith and having its outer periphery connected to the outer periphery of the working chamber, said reservoir chamber and said working chamber being in communication at their outer peripheries, means for controlling the gas pressure in the interior of said reservoir chamber at a point nearer the axis of rotation than the inner periphery of the ring formed by the rotation of the liquid in said reservoir chamber, whereby the flow of liquid between said working chamber and said reservoir chamber is correspondingly controlled, and means for selectively varying the gas pressure in the core of said working chamber to induce the filling or discharge of said working chamber.

7. A hydraulic coupling, including a driving member and a driven member coacting to form a liquid working chamber, each of said members including a dished ring constituting the outer bounding wall of said working chamber, a shell connected to one of said members and forming a reservoir chamber with the dished ring of the other member, said reservoir chamber and said working chamber being in communication at their outer peripheries, and means for selectively controlling the gas pressure in said reservoir chamber to control the flow of liquid between said working chamber and said reservoir chamber.

8. A hydraulic coupling, including a driving member and a driven member coacting to form a liquid working chamber, each of said members including a dished ring constituting the outer bounding wall of said working chamber, a wall member disposed in close proximity to one of said dished rings and connected to the member which includes the other dished ring, a shell connected to the last mentioned member and forming a reservoir chamber with said wall member, said reservoir chamber and said working chamber being in communication at their outer peripheries, and means for selectively controlling the gas pressure in said reservoir chamber to control the flow of liquid between said working chamber and said reservoir chamber.

9. A hydraulic coupling of the Föttinger type, including a driving member and a driven member coacting to form a liquid working chamber, each of said members including a dished ring constituting the outer bounding walls of said working chamber, a shell connected for rotation with one of said members and forming a chamber with the dished ring of the other member, a wall member connected to said last mentioned dished ring and disposed in close proximity to said shell to form a reservoir chamber with said last mentioned dished ring, said working chamber and said reservoir chamber being in communication with each other, and means for selectively varying the gas pressure in the interior of said reservoir chamber.

10. A hydraulic coupling of the Föttinger type, including a driving member, a driven member, said members forming a liquid working chamber therebetween, a shaft connected to one of said members, said shaft having a bore therein, a conduit leading from said bore to the core of said working chamber, and means connected to said bore for selectively varying the pressure in the core of said working chamber.

11. A hydraulic power transmitter, including a pair of hydraulic couplings of the Föttinger type, each having a driving member and a driven member juxtaposed to form a liquid working chamber, the driving members of both couplings being connected together, and the driven members of both couplings being connected together, means for defining a reservoir chamber rotatable with one of said members and having communication with the working chamber of said couplings, and means for selectively varying the gas pressure in the interior of said reservoir chamber, whereby the flow of liquid between said reservoir chamber and the working chambers of the coupling is correspondingly controlled.

12. A hydraulic power transmitter, including a pair of hydraulic couplings of the Föttinger type, each having a driving member and a driven member juxtaposed to form a liquid working chamber, the driving members of said couplings being connected together and the driven members of said couplings being also connected together, means connected to one of said members and rotatable therewith for defining a chamber, means for varying the gas pressure in said chamber, and conduits leading from said chamber into the center of said working chamber.

Signed at Hamburg, Germany, this 24th day of June A. D. 1931.

JOHANN NIKOLAUS KIEP.